United States Patent
Chou

(10) Patent No.: US 12,112,567 B2
(45) Date of Patent: Oct. 8, 2024

(54) BIOMETRIC DETECTION SENSOR AND SIGNAL PROCESSING METHOD THEREOF AND ELECTRONIC PRODUCT

(71) Applicant: Egis Technology Inc., Hsinchu (TW)

(72) Inventor: Bruce C. S. Chou, Hsinchu (TW)

(73) Assignee: Egis Technology Inc., Hsinchu (TW)

(*) Notice: Subject to any disclaimer, the term of this patent is extended or adjusted under 35 U.S.C. 154(b) by 68 days.

(21) Appl. No.: 18/175,574

(22) Filed: Feb. 28, 2023

(65) Prior Publication Data

US 2023/0368565 A1 Nov. 16, 2023

Related U.S. Application Data

(60) Provisional application No. 63/339,983, filed on May 10, 2022.

(30) Foreign Application Priority Data

Dec. 21, 2022 (CN) .......................... 202211655295.7

(51) Int. Cl.
*G06V 40/13* (2022.01)
*G06F 3/041* (2006.01)
(Continued)

(52) U.S. Cl.
CPC .... *G06V 40/1306* (2022.01); *G06F 3/041661* (2019.05); *G06F 21/32* (2013.01); *G06V 40/1365* (2022.01)

(58) Field of Classification Search
CPC ........... G06V 40/1306; G06V 40/1365; G06V 40/1318; G06V 40/13; G06V 10/955;
(Continued)

(56) References Cited

U.S. PATENT DOCUMENTS

| 7,965,877 | B2* | 6/2011 | Qi ...................... | G06V 40/1306 382/124 |
| 2015/0137938 | A1* | 5/2015 | Slaby ................. | G06V 40/1365 340/5.53 |

(Continued)

FOREIGN PATENT DOCUMENTS

| CN | 106464895 A | 2/2017 |
| TW | I549065 B | 9/2016 |

*Primary Examiner* — Jonathan A Boyd
(74) *Attorney, Agent, or Firm* — JCIPRNET

(57) ABSTRACT

The embodiments of the present disclosure provide a biometric detection sensor and a signal processing method thereof. The biometric detection sensor includes an array of detection pixels, the signal processing method includes: acquiring a first detection signal of each detection pixel in the array of detection pixels; for each detection pixel of at least part of detection pixels, processing the first detection signal of the detection pixel based on a reference signal to obtain a detection processing signal of the detection pixel, wherein a resolution of the detection processing signal is lower than that of the first detection signal; and outputting the detection processing signals of the at least part of detection pixels in the array of detection pixels, wherein the detection processing signals are used for biometric identification. The signal processing method can effectively reduce the amount of data for the processor to receive and process during biometric identification.

19 Claims, 6 Drawing Sheets

(51) Int. Cl.
*G06F 21/32* (2013.01)
*G06V 40/12* (2022.01)

(58) Field of Classification Search
CPC .... G06F 3/041661; G06F 21/32; G06F 16/50; G06T 3/40
See application file for complete search history.

(56) References Cited

U.S. PATENT DOCUMENTS

| | | | | |
|---|---|---|---|---|
| 2016/0012273 | A1* | 1/2016 | Westerman | G06V 40/1359 382/124 |
| 2018/0157680 | A1* | 6/2018 | Valsesia | G06F 18/2137 |
| 2022/0075984 | A1* | 3/2022 | Chan | G06T 1/0007 |

* cited by examiner

BIOMETRIC DETECTION SENSOR AND SIGNAL PROCESSING METHOD THEREOF AND ELECTRONIC PRODUCT

CROSS-REFERENCE TO RELATED APPLICATIONS

The present application claims the priorities of a U.S. provisional application No. 63/339,982 filed on May 10, 2022, and a Chinese patent application No. 202211655295.7 filed on Dec. 21, 2022. Herein, the content disclosed by the U.S. provisional application and the Chinese patent application are incorporated in full by reference as a part of the present application.

TECHNICAL FIELD

The present disclosure relates to the field of biometric identification, and more particularly, to a biometric detection sensor, a signal processing method for a biometric detection sensor, and an electronic product including the biometric detection sensor.

BACKGROUND

With the development and progress of science and technology, mobile phones, digital cameras, tablet computers, notebook computers and other electronic devices have become indispensable tools in people's lives. However, in today's information age, how to accurately identify a person's identity and avoid the destruction of data in electronic devices, various data protection methods have become a hot research topic at present.

Traditional identity authentication cannot meet the needs of society because it can be easily forged and lost. At present, the biometric identification technology is one of the most convenient and safe solutions. Biometric detection has advantages such as that it is fast, safe, reliable and accurate. Biometric identification can be used in information security, enterprise management, self-service, entry and exit management, financial services, e-commerce, forensic identification and other application scenarios. Biometric identification has attracted wide attention in many countries because of its broad application prospects and huge social and economic benefits. How to improve biometric identification to make its data processing faster, with higher accuracy and less data amount is one of the key research directions at present.

SUMMARY

In order to reduce amount of data to be received and processed by the processor when performing biometric identification and efficiently improve the processing speed of the processor to achieve rapid and/or wide-area biometric identification, the present disclosure provides a signal processing method, which can reduce amount of data to be transmitted from a biometric sensor to the processor by performing resolution decreasing processing on detection signals at the biometric sensor side, thus helpful for the processor to perform rapid and/or wide-area biometric identification.

According to embodiments of the present disclosure, the biometric detection sensor includes an array of detection pixels, and the signal processing method for the biometric detection sensor comprises: acquiring a first detection signal of each detection pixel in the array of detection pixels; for each detection pixel of at least part of detection pixels in the array of detection pixels, processing the first detection signal of the detection pixel based on a reference signal to obtain a detection processing signal of the detection pixel, wherein a resolution of the detection processing signal is lower than that of the first detection signal; and outputting the detection processing signals of the at least part of detection pixels in the array of detection pixels, wherein the detection processing signals are used for biometric identification.

According to embodiments of the present disclosure, the signal processing method further comprises: acquiring second detection signals of the at least part of detection pixels in the array of detection pixels in the case where no biometric detection is performed; and determining the reference signal based on the second detection signals of the at least part of detection pixels in the case where no biometric detection is performed.

According to embodiments of the present disclosure, the signal processing method determines the reference signal according to any one of the following: determining the reference signal for each detection pixel based on the second detection signal of the detection pixel in the case where no biometric detection is performed; or determining the reference signal for each preset area based on the second detection signals of the at least part of detection pixels in the preset area in the case where no biometric detection is performed, wherein the array of detection pixels includes at least two preset areas; or determining the reference signal for the array of detection pixels based on the second detection signals of the at least part of detection pixels in the array of detection pixels in the case where no biometric detection is performed.

According to embodiments of the present disclosure, the reference signal is preset, and the reference signal is determined according to any one of the following: determining the reference signal for each detection pixel based on a preset calibration signal of the detection pixel; or determining the reference signal for each preset area based on a preset calibration signal of the preset area, wherein the array of detection pixels includes at least two preset areas; or determining the reference signal for the array of detection pixels based on a preset calibration signal of the array of detection pixels.

According to embodiments of the present disclosure, for each detection pixel of the at least part of detection pixels, the first detection signal of the detection pixel is binarized based on the reference signal, to obtain the detection processing signal of the detection pixel.

According to embodiments of the present disclosure, for each of the at least part of detection pixels, the detection processing signal of the detection pixel is generated based on a difference between the first detection signal and the reference signal, wherein in the case where the difference between the first detection signal of the detection pixel and the reference signal is smaller than a first threshold, the detection processing signal is determined to be a first value; in the case where the difference between the first detection signal of the detection pixel and the reference signal is greater than or equal to the first threshold, the detection processing signal is determined to be a second value.

According to embodiments of the present disclosure, the biometric detection sensor is a fingerprint sensor, wherein the detection processing signal corresponding to a fingerprint concave portion is the first value; and the detection processing signal corresponding to a fingerprint convex portion is the second value.

According to embodiments of the present disclosure, the fingerprint sensor is an ultrasonic fingerprint sensor or a capacitive fingerprint sensor.

According to embodiments of the present disclosure, the signal processing method further comprises: outputting the first detection signals of the at least part of detection pixels in the array of detection pixels in response to an output switching signal, wherein the first detection signals of the at least part of detection pixels are grayscale signals or chromatic signals.

According to embodiments of the present disclosure, the array of detection pixels includes a first area and a second area, and the at least part of detection pixels are located in the first area of the array of detection pixels, and the signal processing method further comprises: for the detection pixels located in the second area, outputting the first detection signal of each detection pixel in the second area.

According to embodiments of the present disclosure, there is further provided a biometric detection sensor for being arranged opposite to a touch cover, comprising: an array of detection pixels including a plurality of detection pixels, wherein for at least part of detection pixels among the plurality of detection pixels, each detection pixel includes a detection electrode and a detection circuit for generating a first detection signal, and a signal processing circuit configured to process the first detection signal of the detection pixel based on a reference signal to obtain a detection processing signal of the detection pixel, wherein a resolution of the detection processing signal is lower than that of the first detection signal; and a signal output circuit configured to output the detection processing signals of the at least part of detection pixels in the array of detection pixels, wherein the detection processing signals are used for performing biometric identification.

According to embodiments of the present disclosure, there is further provided an electronic product that comprises the biometric detection sensor and realizes biometric identification by the above signal processing method.

By the signal processing method of the present disclosure, amount of data to be transmitted from a biometric sensor to the processor can be reduced since resolution decreasing processing is firstly performed on detection signals at the biometric sensor side and then detection processing signals thus obtained with low resolution are provided to the processor. Because the amount of data to be received and processed by the processor is reduced for each detected pixel or the pixel array per unit area, the processing speed of the processor is significantly improved. Therefore, with decreasing of amount of data to be transmitted for the pixel array per unit area, the biometric detection method of the present disclosure enables the processor to process more signals of detection pixels concurrently, which is helpful for realizing biometric identification in a larger area and thus expanding the application range of the processor.

BRIEF DESCRIPTION OF DRAWINGS

In order to more clearly explain the technical solutions of the embodiments of the present disclosure, the drawings used in the description of the embodiments will be briefly introduced below. Obviously, the drawings in the following description are only some exemplary embodiments of the present disclosure. For those of ordinary skill in the art, other drawings may be obtained according to these drawings without any creative effort.

Here, in the drawings.

DETAILED DESCRIPTION

Figure 1:
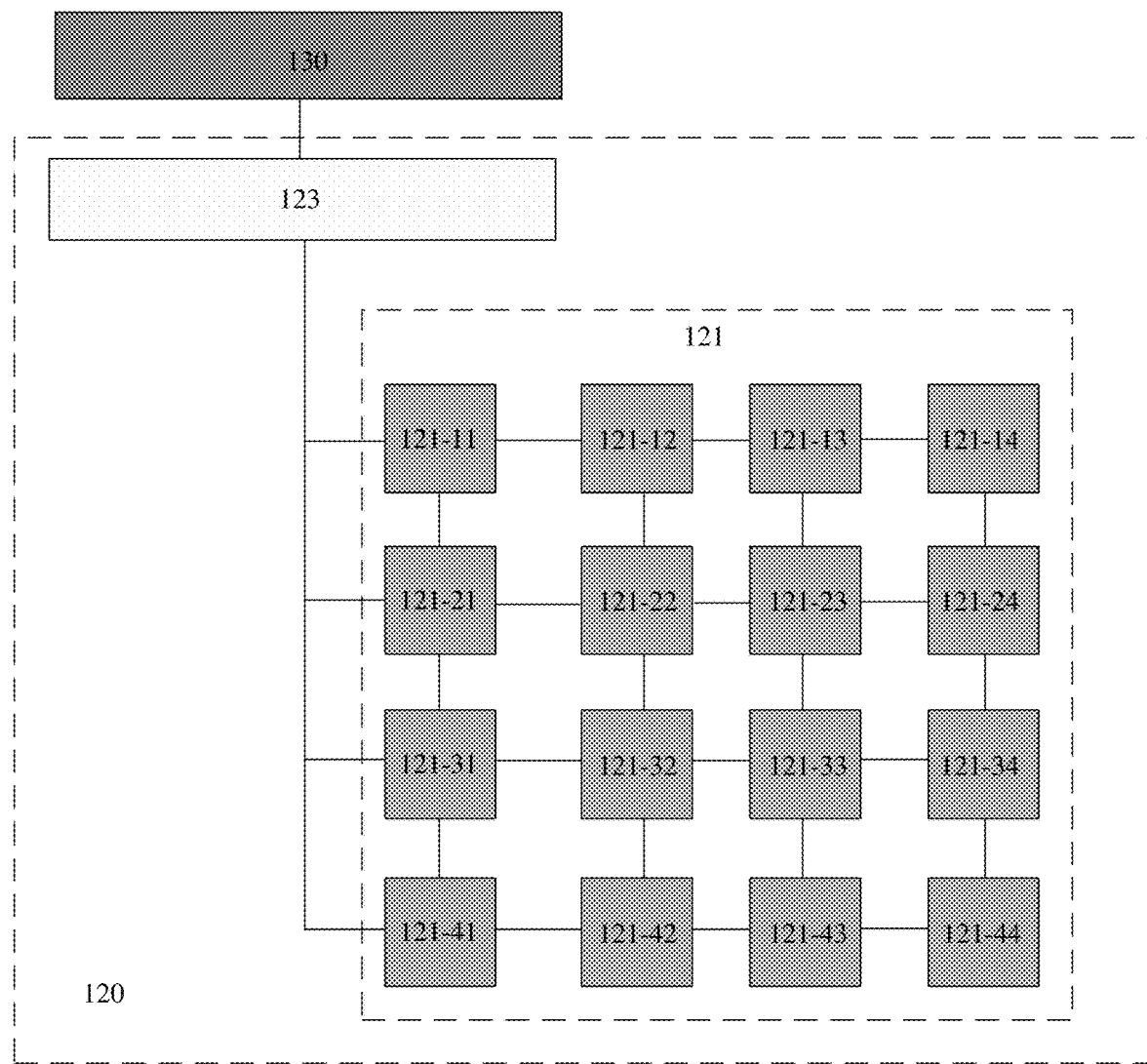
FIG. 1 is a schematic diagram showing the internal structure of an electronic product including a biometric detection sensor according to an embodiment of the present disclosure.

In order to make the objectives, technical solutions and advantages of the present application more apparent, the exemplary embodiments according to the present disclosure will be described in detail below with reference to the drawings. Obviously, the described embodiments are only part of the embodiments of the present application, rather than all the embodiments of the present application, and it should be understood that the present application is not limited by the example embodiments described herein.

Furthermore, in this specification and the drawings, steps and elements that are substantially the same or similar are denoted by the same or similar reference signs, and repeated descriptions of these steps and elements will be omitted.

Furthermore, in the specification and the drawings, elements are described in singular or plural forms according to the embodiments. However, the singular and plural forms are appropriately selected for the proposed situations only for convenience of explanation, not intended to limit the present disclosure thereto. Therefore, singular forms may include plural forms, and plural forms may also include singular forms, unless the context clearly indicates otherwise.

Furthermore, in the specification and the drawings, the involved terms "first/second" are only used to distinguish similar objects, and do not represent a specific order of objects. Understandably, "first/second" may be interchanged in a specific order or sequence when allowed, so that the embodiments of the present disclosure described here may be implemented in an order other than those illustrated or described here.

Furthermore, in the specification and the drawings, the adopted terms such as "upper", "lower", "vertical" and "horizontal" which relate to orientation or positional relationship are used only for convenience in describing the embodiments according to the present disclosure, and are not intended to limit the present disclosure thereto. Therefore, they should not be construed as a limitation to the present disclosure.

Furthermore, in the specification and the drawings, unless otherwise specified, "connection" does not necessarily mean "direct connection" or "direct contact". Here, "connection" may mean the function of fixation, and also may mean electrical communication.

The rapid development of informationization is characterized by digitalization and invisibility of personal identity. How to accurately authenticate a person's identity and protect information security is a key social problem that must be solved in today's informationization age. Biometric identification technology is a research hotspot in the field of identity authentication. Biometric identification technology refers to the technology that uses the inherent physiological or behavioral features of human body to identify and authenticate individual identity. Compared with the traditional identity authentication means, the identity authentication technology based on biometric identification has the advantages of being incapable to be forgotten or lost, good anti-counterfeiting performance, not easy to be forged or stolen, "carrying around", being available anytime and anywhere, etc., and has a broad application prospect.

As an example, the present disclosure relates to the field of biometric identification, and the embodiments of the present disclosure will be further described below with reference to the drawings.

FIG. 1 is a schematic diagram showing the internal structure of an electronic product including a biometric detection sensor according to an embodiment of the present disclosure.

According to an embodiment of the present disclosure, the electronic product can include a biometric detection sensor. Optionally, the electronic product can refer to a mobile phone, a computer, a tablet computer, etc.

More specifically, the electronic product can include a touch cover, a biometric detection sensor 120, a processor 130, and other components.

It should be understood that the touch cover in the present disclosure can be located at the front of the display screen of the electronic product, at the rear cover of the electronic product, or at the side frame of the electronic product etc., no limitation is made here. Optionally, the touch cover can be implemented in the form of a touch display screen of the electronic product or located on a touch screen, or the touch cover can be integrated on the keys of the electronic product. According to an embodiment of the present disclosure, the biometric detection sensor is arranged opposite to the touch cover, and the biometric detection sensor can detect the biological contact on the touch cover. For example, in the case where the touch cover is located at the side frame of the electronic product, the biometric detection sensor is arranged in the electronic product at a position close to the side frame, such that the biometric detection sensor is arranged opposite to the touch cover. For another example, when the touch cover is located on the display screen or serves as the touch screen, the biometric detection sensor is arranged below the touch cover, such that the biometric detection sensor is arranged opposite to the touch cover.

Optionally, other components can include components for structural fixing, components for providing electric energy, components for realizing other functions, etc.

As shown in FIG. 1, the biometric detection sensor 120 can include an array 121 of detection pixels and a signal output circuit 123.

The array 121 of detection pixels can include a plurality of detection pixels (e.g., the detection pixels 121-11 to 121-44 in FIG. 1), and for at least part of detection pixels among the plurality of detection pixels, each detection pixel includes: a detection electrode, a detection circuit, and a signal processing circuit. The detection electrode and the detection circuit are used for generating a first detection signal. The signal processing circuit can be configured to process the first detection signal of the detection pixel based on a reference signal to obtain a detection processing signal of the detection pixel, wherein a resolution of the detection processing signal is lower than that of the first detection signal.

It should be noted that, for the present disclosure, the resolution of a signal refers to the resolution capability (or differentiating capability) for the detection signal of a single detection pixel. According to embodiment of the present disclosure, the resolution can correspond to a bit depth of the grayscale signal, or can be represented by the maximum grayscale value of the grayscale signal or the bit depth of the grayscale signal. For example, for a grayscale signal with a value range of 0 to 255, it can be represented by 8 bits, and its resolution can be 8 bits or 256; for a binary signal, it can be represented by 1 bit, and its resolution can be 1 bit or 2.

In addition, the number of detection pixels can be determined according to the actual requirements. In FIG. 1, the array 121 of detection pixels composed of 16 detection pixels (detection pixels 121-11 to 121-44) is used as an illustration, rather than a limitation.

The signal output circuit 123 can be configured to output the detection processing signal of the at least part of detection pixels in the array of detection pixels to the processor 130, wherein the detection processing signal is used for performing biometric identification. Optionally, the processor 130 can be a processor inside the biometric sensor or another processor connected with the biometric sensor.

Optionally, the biometric sensor can further include a row selection circuit and a column selection circuit (not shown) for providing a row synchronization signal or a column synchronization signal, so as to control the signal of the detection pixel to be transmitted in a row-wise or column-wise manner.

Through the processing of the signal processing circuit, since the resolution of the detection processing signal is lower than that of the first detection signal, the amount of data to be processed by the processor is reduced.

In order to better understand the content of the present disclosure, the operation principle of the circuit will be explained in the following with a single pixel as a unit in FIGS. 2 and 3.

Figure 2:
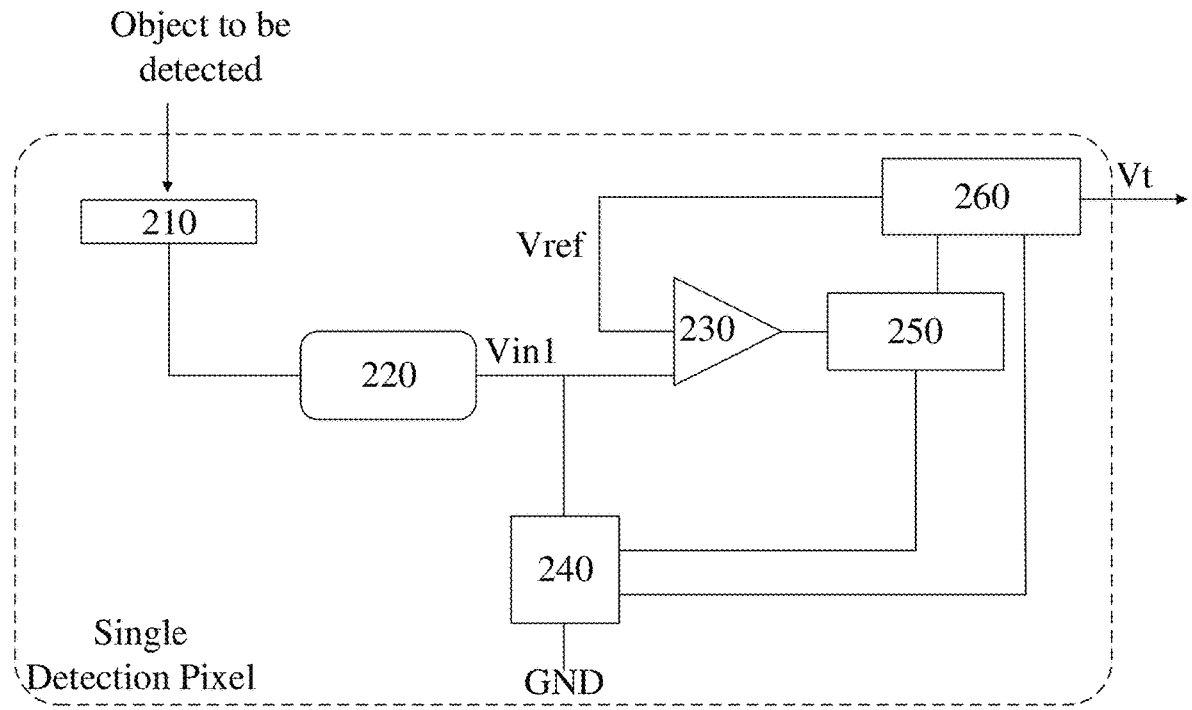
FIG. 2 is a schematic principle diagram showing a circuit for a single detection pixel in a biometric detection sensor according to an embodiment of the present disclosure.

FIG. 2 is a schematic principle diagram showing a circuit for a single detection pixel in a biometric detection sensor according to an embodiment of the present disclosure.

For each detection pixel, its circuit can include a detection electrode 210, a detection circuit 220, and a signal processing circuit. The detection electrode 210 and the detection circuit 220 can detect the object to be detected and generate the first detection signal Vin1. The signal processing circuit can process the first detection signal Vin1 of the detection pixel based on the reference signal to obtain the detection processing signal Vt of the detection pixel, wherein the resolution of the detection processing signal Vt is lower than that of the first detection signal Vin1.

More specifically, the signal processing circuit can include a comparison circuit 230, a reset circuit 240, and a data holding circuit 250 etc.

By means of comparing the first detection signal Vin1 with the reference signal Vref by the comparison circuit 230, resolution decreasing processing can be performed on the first detection signal Vin1, thereby the detection processing signal Vt of the detection pixel is obtained.

The reset circuit 240 can be connected to the ground wire (GND) for resetting the circuit. For example, the reset circuit can be used to initialize the biometric detection sensor before biometric detection is performed, and to restart the biometric detection sensor when a failure occurs, and so on.

The data holding circuit 250 is connected to the output of the comparison circuit 230 and is used for holding the detection processing signal Vt.

The detection processing signal Vt of each detection pixel can be outputted by a detection pixel output circuit 260 of the detection pixel, gathered, and then provided via the signal output circuit 123 as shown in FIG. 1 to the processor for processing, so as to realize biometric identification.

According to an embodiment of the present disclosure, the resolution decreasing processing can be binarization processing. For example, the first detection signal Vin1 of the detection pixel can be binarized based on the comparison circuit 230 to obtain the binarized detection processing signal Vt of the detection pixel. More specifically, the binarized detection processing signal Vt of the detection pixel can be generated based on a difference between the first detection signal Vin1 and the reference signal Vref. For example, in the case where the difference between the first detection signal Vin1 of the detection pixel and the reference signal Vref is smaller than a first threshold, the detection processing signal Vt is determined to be a first value (e.g., 0); in the case where the difference between the first detection signal Vin1 of the detection pixel and the reference signal Vref is greater than or equal to the first threshold, the detection processing signal Vt is determined to be a second value (e.g., 1).

According to an embodiment of the present disclosure, other resolution decreasing processing can be also performed on the first detection signal Vin1 of the detection pixel based on the comparison circuit 230 to obtain the detection processing signal Vt of the detection pixel. More specifically, the first detection signal Vin1 can be compared with a plurality of different reference signals, respectively (e.g., the comparison circuit 230 includes a plurality of comparators), so as to generate the detection processing signal Vt of the detection pixel (that is, a resolution decreased version of the first detection signal Vin1). For example, in the case where the first detection signal Vin1 of the detection pixel is smaller than a first reference signal Vref1, the detection processing signal Vt is determined to be a first value (e.g., 0); in the case where the first detection signal Vin1 of the detection pixel is greater than or equal to the first reference signal Vref1 and less than a second reference signal Vref2, the detection processing signal Vt is determined to be a second value (e.g., 1); in the case where the first detection signal Vin1 of the detection pixel is greater than or equal to the second reference signal Vref2 and less than a third reference signal Vref3, the detection processing signal Vt is determined to be a third value (e.g., 2); in the case where the first detection signal Vin1 of the detection pixel is greater than or equal to the third reference signal Vref3 and less than or equal to a fourth reference signal Vref4, the detection processing signal Vt is determined to be a fourth value (e.g., 3), wherein Vref4>Vref3>Vref2>Vref1 (Vref1, Vref2, Vref3 and Vref4 are not shown). It should be understood that the plurality of different reference signals here can be selected according to the requirements of actual resolution decreasing processing.

It should be understood that the reference signal can be determined either based on a signal of the detection pixel acquired in the case where no biometric detection is performed or based on a preset value.

For example, the reference signal can be determined based on a second detection signal in the case where no biometric detection is performed. More specifically, the case where no biometric detection is performed can include: the case where biometric detection has been triggered but not been performed yet; or the case where biometric detection has neither been triggered nor been performed etc. The process of acquiring the second detection signal of the detection pixel in the array of detection pixels can be performed before or after the biometric detection is performed.

It should be noted that both the first detection signal and the second detection signal in the present disclosure are detection signals obtained by measuring signals of detection pixels, wherein the first detection signal is the detection signal of a detection pixel obtained in the case where biometric detection is performed; the second detection signal is the detection signal of a detection pixel obtained in the case where no biometric detection is performed.

Optionally, the reference signal can be determined according to any one of the following items, or any combination of the following items (e.g., weighted average of multiple items): determining the reference signal for each detection pixel based on the second detection signal of the detection pixel in the case where no biometric detection is performed; or determining the reference signal for each preset area based on the second detection signal of detection pixels in the preset area in the case where no biometric detection is performed, wherein the array of detection pixels includes at least two preset areas; or determining the reference signal for the array of detection pixels based on the second detection signal of detection pixels in the array of detection pixels in the case where no biometric detection is performed.

In addition, in the case where the reference signal is determined based on a preset value, the reference signal can be determined according to any one of the following items, or any combination of the following items (e.g., weighted average of multiple items): determining the reference signal for each detection pixel based on a preset calibration signal of the detection pixel; or determining the reference signal for each preset area based on a preset calibration signal of the preset area, wherein the array of detection pixels includes at least two preset areas; or determining the reference signal for the array of detection pixels based on a preset calibration signal of the array of detection pixels.

Optionally, for the instance shown in FIG. 2, the positions of terminals for inputting the first detection signal Vin1 and the reference signal Vref in the comparison circuit 230 can be interchanged (e.g., the first detection signal Vin1 is inputted at a positive input terminal of the comparison circuit 230, and the reference signal Vref is inputted at a negative input terminal of the comparison circuit 230; or, the reference signal Vref is inputted at a positive input terminal of the comparison circuit 230, and the first detection signal Vin1 is inputted at a negative input terminal of the comparison circuit 230).

Figure 3:
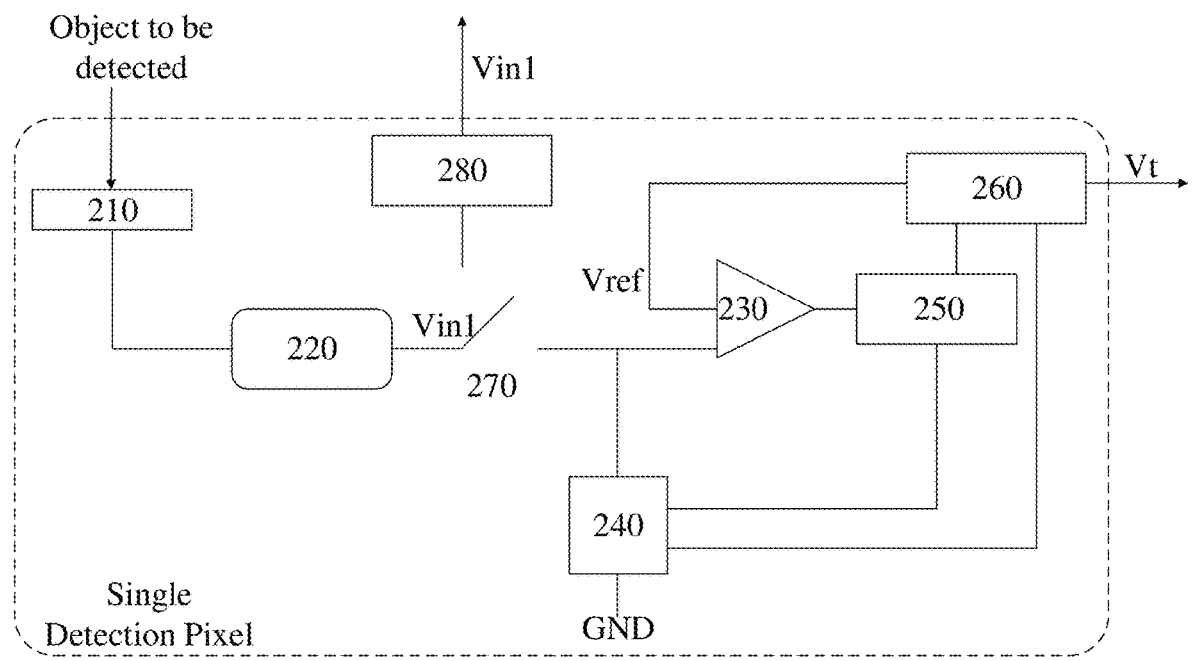
FIG. 3 is a schematic principle diagram showing a circuit for a single detection pixel in a biometric detection sensor according to another embodiment of the present disclosure.

FIG. 3 is a schematic principle diagram showing a circuit for a single detection pixel in a biometric detection sensor according to another embodiment of the present disclosure. On the basis of the instance shown in FIG. 2, the example in FIG. 3 further includes a switching circuit 270, the biometric detection sensor can choose, through the switching circuit 270, to output the first detection signal Vin1 of the detection pixel via the detection pixel output circuit 280 or output the detection processing signal Vt of the detection pixel via the detection pixel output circuit 260. After the first detection signal Vin1 outputted by the detection pixel output circuit 280 or the detection processing signal Vt outputted by the detection pixel output circuit 260 is gathered, it can be provided by the signal output circuit 123 as shown in FIG. 1 to the processor for processing, so as to realize biometric identification.

The first detection signal Vin1 can be a grayscale signal or a chromatic signal, the detection processing signal Vt can be a low resolution signal (i.e. resolution decreased signal) (e.g., a binary signal). For example, the output can be switched according to different detection time or detection requirements. For example, in the case where there is a large amount of data to be processed but the data accuracy requirement is not high, the low resolution signal (i.e. resolution decreased signal) (e.g., the binary signal) can be outputted to realize fast processing; in the case where the amount of data to be processed is not large but the data accuracy requirement is high, the grayscale signal or the chromatic signal is outputted to realize accurate processing, and so on.

Optionally, different signals can be outputted for different areas. For example, the array of detection pixels includes a first area and a second area, the detection processing signal Vt is outputted for the detection pixels located in the first area of the array of detection pixels, the first detection signal is outputted for the detection pixels located in the second area of the array of detection pixels. In this way, it is possible to output high resolution signals (e.g., high resolution grayscale signals, chromatic signals, etc.) for the detection pixels in the second area that need richer detection information, so as to realize accurate biometric identification, and to output low resolution signals (e.g., binary signals) for the detection pixels in the first area that do not need high resolution signals, so as to reduce the amount of data to be processed when performing biometric identification.

According to yet another embodiment of the present disclosure, in the case where a plurality of detection processing signals with different resolutions are obtained by a plurality of different comparison circuits, the switching circuit can also be used to perform switching among the plurality of detection processing signals with different resolutions. For example, the detection processing signals can include the detection processing signal of the first resolution, the detection processing signal of the second resolution and the detection processing signal of the third resolution, and the detection processing signal of the first resolution, the detection processing signal of the second resolution and the detection processing signal of the third resolution can be switched to output by using the switching circuit.

Figure 4A:
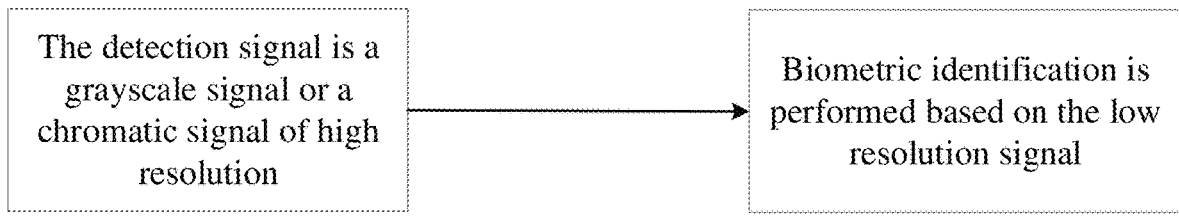
FIGS. 4A to 4B are schematic diagrams illustrating a biometric identification process according to an embodiment of the present disclosure.

For the example shown in FIG. 2, FIG. 4A is a schematic diagram illustrating a biometric identification process according to an embodiment of the present disclosure.

For at least part of detection pixels, the acquired biometric detection signal is a high resolution grayscale signal or chromatic signal when biometric detection is performed. Based on the biometric detection signal and the reference signal, the detection processing signal of the detection pixel can be obtained, the detection processing signal is a low resolution signal (e.g., a binary signal) with a resolution lower than that of the biometric detection signal (i.e. resolution decreased signal). By performing biometric identification based on the detection processing signal, the amount of data to be processed during biometric identification can be effectively reduced.

Figure 4B:
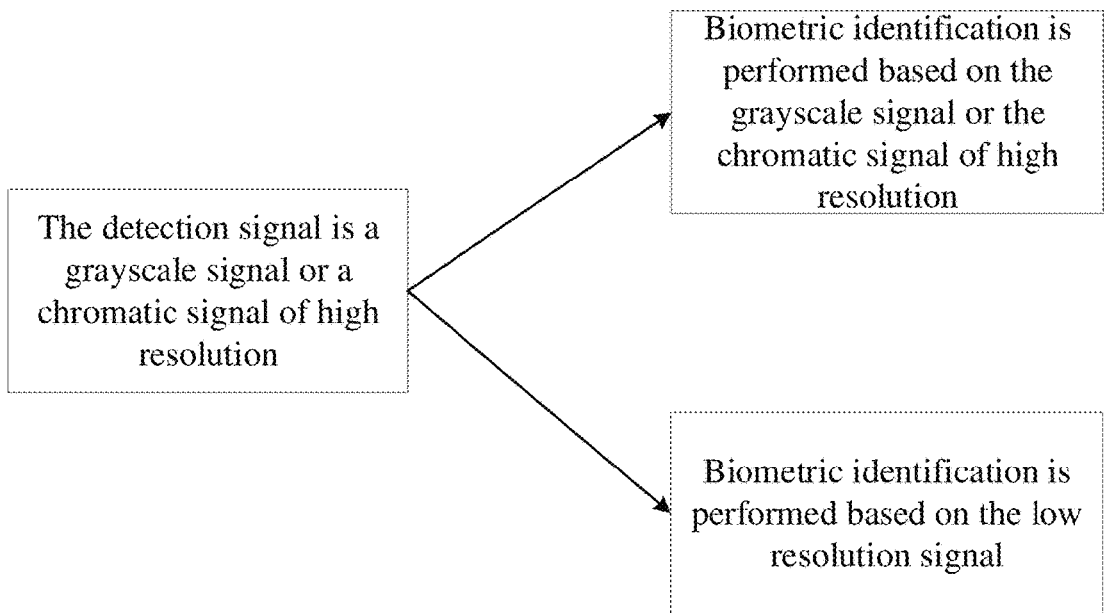

For the example shown in FIG. 3, FIG. 4B is a schematic diagram illustrating a biometric identification process according to an embodiment of the present disclosure.

For at least part of the detection pixels, high resolution biometric detection signals (e.g., grayscale signals or chromatic signals) can be selectively outputted by the switching circuit to the processor so as to realize biometric identification, or low resolution detection processing signals can be selectively outputted by the switching circuit to the processor so as to realize biometric identification. With this embodiment, biometric identification under different resolution requirements can be met.

From the above description, it can be seen that the biometric detection sensor can realize resolution conversion of the detection signal through its internal circuit when performing biometric detection, with no need of transmitting the detection signal to the processor and then further performing resolution conversion by the processor, which effectively reduces processing amount of the processor. Since the resolution decreasing processing is performed on the detection signal at the biometric sensor side and the solution decreased detection signal is then provided to the processor, the amount of data transmitted between the biometric sensor and the processor is reduced.

The data amount reduction effect of the method according to an embodiment of the present disclosure will be explained by the following specific examples. For example, in the case where the detection signal of each detection pixel is the grayscale signal in the range of 0 to 255, each detection pixel needs at least 8-bit space for storage. If the detection signal of each detection pixel is further processed into the binary signal, the detection processing signal thus obtained is the binary signal in the form of 0 and 1, and only 1 bit space is needed for storage. Assuming that the signals of 1000 detection pixels are needed for biometric detection, the amount of data that the processor needs to receive and process from the biometric detection sensor is 8000 bits in the case where biometric identification is performed based on the detection signals of the detection pixels, while the amount of data that the processor needs to receive and process from the biometric detection sensor is only 1000 bits in the case where biometric identification is performed based on the binarized detection processing signals, and the amount of data that the processor needs to receive and process is reduced to ⅛ (that is, the amount of data is reduced by 87.5%), and the processing efficiency of the processor is significantly improved.

In addition, for the above example, assuming that in the case where biometric identification is performed based on binarized detection processing signals, the processor still keeps the original data receiving and processing amount unchanged (that is, it still receives and processes 8,000 bits of data), then the number of detection pixels that the processor can actually process can be increased to 8 times that in the case where biometric identification is performed based on detection signals of detection pixels. The biometric detection method of the present disclosure can realize biometric identification of a larger area or improve the frame rate of biometric identification in the case where the processor processes the same amount of data.

Therefore, according to the biometric detection method of the present disclosure, taking a detection pixel as a processing unit, the resolution decreasing processing of the detection signal of the detection pixel can be realized at the biometric detection sensor side, which effectively reduces the amount of data received and processed by the processor, and effectively improves the processing speed of the processor. In addition, the biometric detection method of the present disclosure enables the processor to process signals of more detection pixels concurrently, thus expanding the application range of the processor.

In order to better understand the content of the present disclosure, FIGS. 5 to 8B take a fingerprint identification scenario as an example for further explanation.

Figure 5:
FIG. 5 is a schematic diagram showing different areas of fingerprint and their corresponding signals in a fingerprint identification application scenario according to an embodiment of the present disclosure.

FIG. 5 is a schematic diagram showing different areas of fingerprint and their corresponding signals in a fingerprint identification application scenario according to an embodiment of the present disclosure.

As shown in FIG. 5, when fingerprint detection is performed, for the touched area, the image of the fingerprint convex portion 510 is in a dark stripe shape and the image of the fingerprint concave portion 520 is in a light stripe shape, while the untouched area 530 is in a light color image. As can be seen from FIG. 5, the color difference between the image of the fingerprint concave portion 520 and the image of the untouched area 530 is not significant, but the image of the fingerprint convex portion 510 and the image of the fingerprint concave portion 520 (or the image of the untouched area) is obvious. That is, in the case where fingerprint identification is performed, the following relationship exists among the signal V1 of the fingerprint convex portion 510, the signal V2 of the fingerprint concave portion 520, and the signal V0 of the untouched area: $V1>V2 \approx V0$. Especially in the part far away from the touched area, the difference between the signal V2 of the fingerprint concave portion 520 and the signal V0 of the untouched area is very small. However, the signals in each area of the touch cover are the same in the case where no fingerprint identification is performed.

Thus, the detected fingerprint signal is binarized to obtain the binarized fingerprint processing signal for performing fingerprint identification. Specifically, for each detection pixel used for fingerprint identification, the fingerprint processing signal is determined based on the difference between the detected fingerprint signal and a reference signal (e.g., the signal V0 of the untouched area, or a predetermined background signal, etc.). The fingerprint processing signal is determined to be a first value (e.g., 0) in the case where the difference between the detected fingerprint signal of the detection pixel and the reference signal is smaller than a first threshold; the fingerprint processing signal is determined to be a second value (e.g., 1) in the case where the difference between the detected fingerprint signal of the detection pixel and the reference signal is greater than or equal to the first threshold.

Through binarization, the fingerprint processing signals corresponding to respective detection pixels used for fingerprint identification can form a binary numerical matrix. Because it is much easier for the processor to process the binary numerical matrix than to process the grayscale value matrix, the fingerprint identification speed is significantly improved.

For example, the signal of the fingerprint concave portion 520 is close to the reference signal, the fingerprint processing signal corresponding to the fingerprint concave portion 520 is 0; the signal of the fingerprint convex portion 510 is quite different from the reference signal, the fingerprint processing signal corresponding to the fingerprint convex portion 510 is 1; finally, the fingerprint processing signals corresponding to each detection pixel in the touched area form a 01 matrix. Actually, when the 01 matrix is passed to the processor for further fingerprint identification, the processor will process a sparse 01 matrix. Therefore, when fingerprint identification is performed, the data to be actually processed by the processor is reduced, the processing becomes very easy, and the processing speed is significantly improved.

Figure 6:
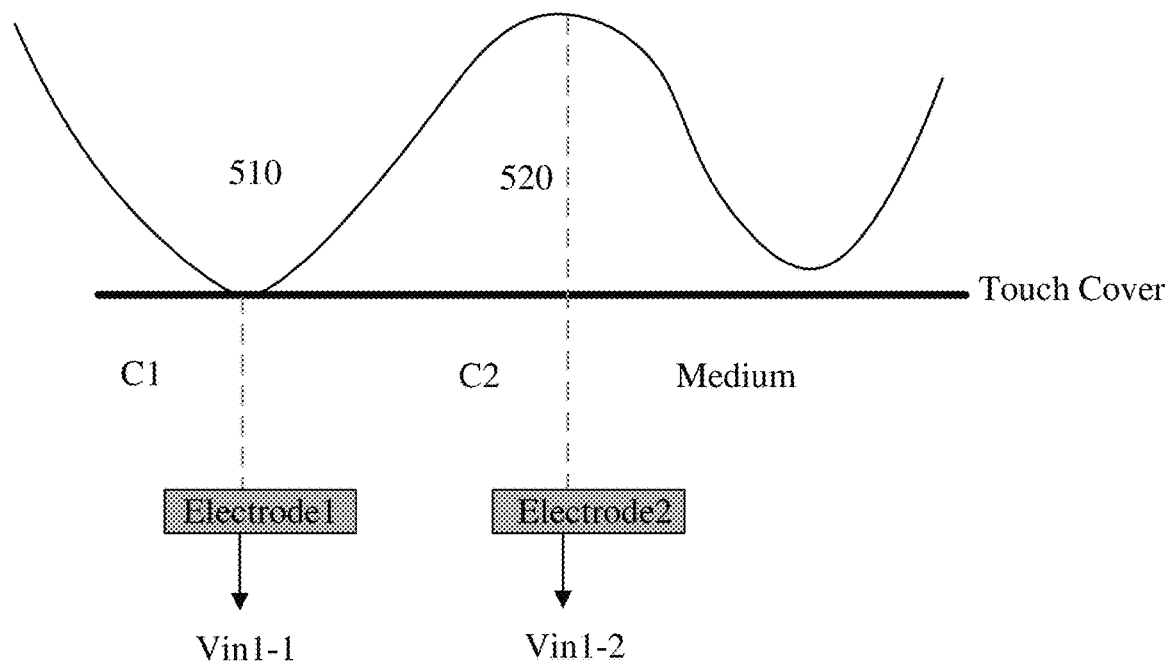
FIG. 6 is a schematic diagram showing that the biometric detection sensor is a capacitive fingerprint sensor according to an embodiment of the present disclosure.

FIG. 6 is a schematic diagram showing that the biometric detection sensor is a capacitive fingerprint sensor according to an embodiment of the present disclosure.

As shown in FIG. 6, in the process of performing fingerprint identification, since the distance between the fingerprint convex portion 510 and the electrode 1 is close and the distance between the fingerprint concave portion 520 and the electrode 2 is far, the value of the first capacitance C1 between the fingerprint convex portion 510 and the electrode 1 is larger than the value of the second capacitance C2 between the fingerprint concave portion 520 and the electrode 2. The amplitude of the fingerprint signal Vin1-1 corresponding to the first capacitor C1 is larger than that of the fingerprint signal Vin1-2 corresponding to the second capacitor C2. Therefore, the fingerprint convex portion 510 and the fingerprint concave portion 520 can be distinguished by the capacitive fingerprint sensor, so as to realize fingerprint identification.

The fingerprint processing signal corresponding to the fingerprint convex portion 510 can be obtained by comparing the fingerprint signal Vin1-1 with the reference signal; the fingerprint processing signal corresponding to the fingerprint concave portion 520 can be obtained by comparing the fingerprint signal Vin1-2 with the reference signal.

It should be noted that the reference signal can be a signal which reflects the case where no fingerprint identification is performed, for example, a background signal, a predetermined value signal, etc. The reference signals to be compared with the fingerprint signal Vin1-1 and the fingerprint signal Vin1-2 can be the same or slightly different according to the actual situation. The electrode 1 and the electrode 2 can correspond to the detection electrode 210 in FIGS. 2 and 3, the fingerprint signal Vin1-1 and the fingerprint signal Vin1-2 can correspond to the first detection signal Vin1 in FIGS. 2 and 3.

Figure 7:
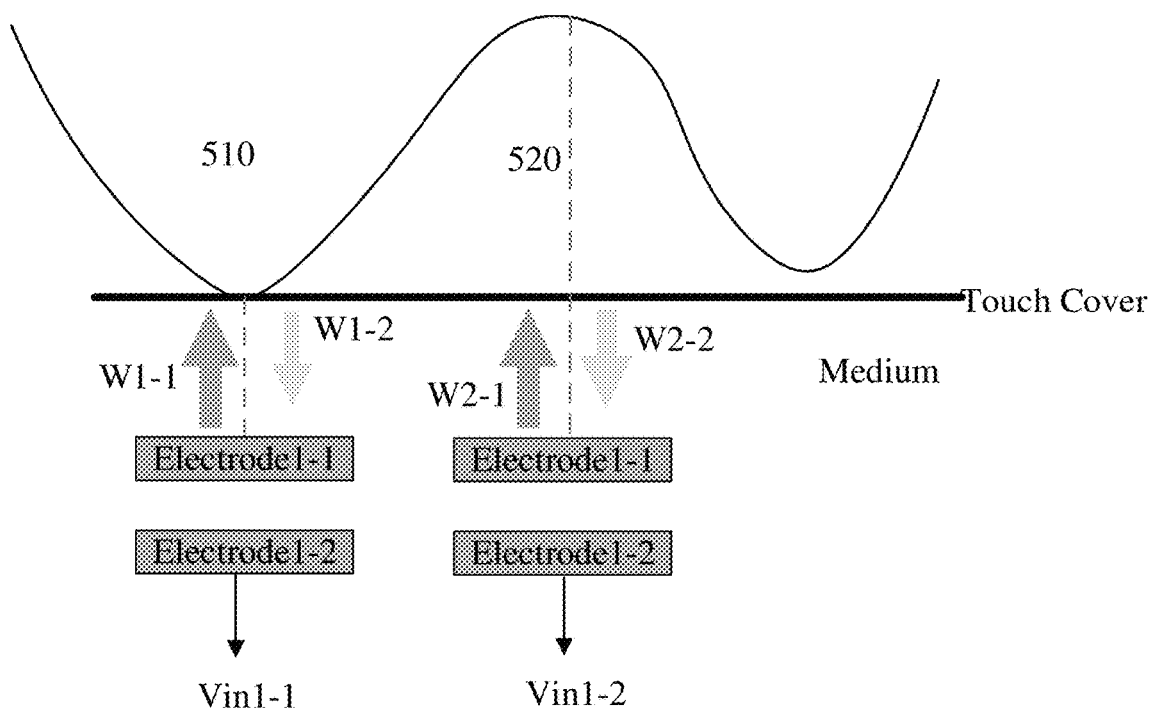
FIG. 7 is a schematic diagram showing that the biometric detection sensor is an ultrasonic fingerprint sensor according to an embodiment of the present disclosure.

FIG. 7 is a schematic diagram showing that the biometric detection sensor is an ultrasonic fingerprint sensor according to an embodiment of the present disclosure.

As shown in FIG. 7, in the process of performing fingerprint identification, when the ultrasonic transmitter transmits ultrasonic waves to the finger to be identified, more energy of the transmitted wave W1-1 is absorbed by the fingerprint convex portion 510 because the gap between the fingerprint convex portion 510 and the touch cover is small, and the energy difference between the transmitted wave W1-1 and the reflected wave W1-2 is large. Whereas the gap between the fingerprint concave portion 520 and the touch cover is large, part of ultrasonic waves will be reflected back through the air, less ultrasonic waves are absorbed by the fingerprint concave portion 520, and the energy difference between the transmitted wave W2-1 and the reflected wave W2-2 is small. Thus, when the energy of the transmitted wave W1-1 is the same as that of the transmitted wave W2-1, the reflected wave W1-2 and the reflected wave W2-2 have different energies, and the fingerprint signal Vin1-1 generated at the fingerprint convex portion 510 is different from the fingerprint signal Vin1-2 generated at the fingerprint concave portion 520. Therefore, the fingerprint convex portion 510 and the fingerprint concave portion 520 can be distinguished by the ultrasonic fingerprint sensor, so as to realize fingerprint identification.

The fingerprint processing signal corresponding to the fingerprint convex portion 510 can be obtained by comparing the fingerprint signal Vin1-1 with the reference signal; the fingerprint processing signal corresponding to the fingerprint concave portion 520 can be obtained by comparing the fingerprint signal Vin1-2 with the reference signal.

It should be noted that the reference signal can be a signal which reflects the case where no fingerprint identification is performed, for example, a background signal, a predetermined value signal etc. The reference signals to be compared with the fingerprint signal Vin1-1 and the fingerprint signal Vin1-2 can be the same or slightly different according to the actual situation. The electrode 1-1 and the electrode 1-2 can be used together as the detection electrode 210 in FIGS. 2 and 3, similarly, the electrode 2-1 and the electrode 2-2 can be used together as the detection electrode 210 in FIGS. 2 and 3, and fingerprint signal Vin1-1 and fingerprint signal Vin1-2 can correspond to the first detection signal Vin1 in FIGS. 2 and 3.

According to an embodiment of the present disclosure, the ultrasonic fingerprint sensor can be implemented based on piezoelectric micro-mechanical ultrasonic transducer (PMUT) or capacitive micro-mechanical ultrasonic transducer (CMUT).

It should be understood that the capacitive sensor or the ultrasonic sensor shown in FIGS. 6 and 7 can be used not only in fingerprint identification scenarios, but also in other similar biometric identification scenarios.

Figure 8B:
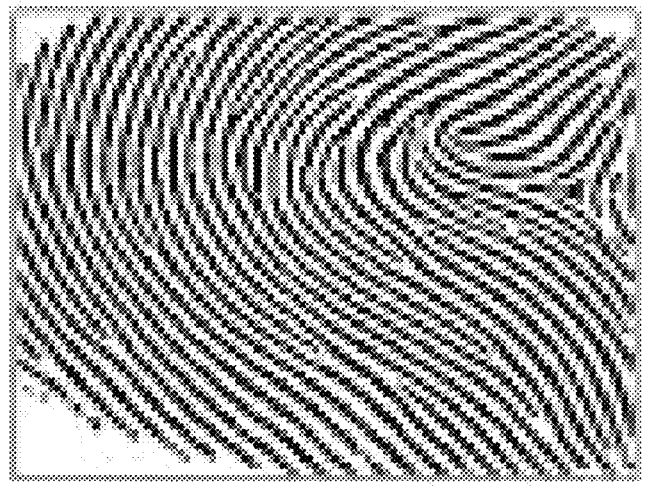
FIGS. 8A to 8B are schematic diagrams illustrating fingerprint identification effects according to an embodiment of the present disclosure.
Figure 8A:
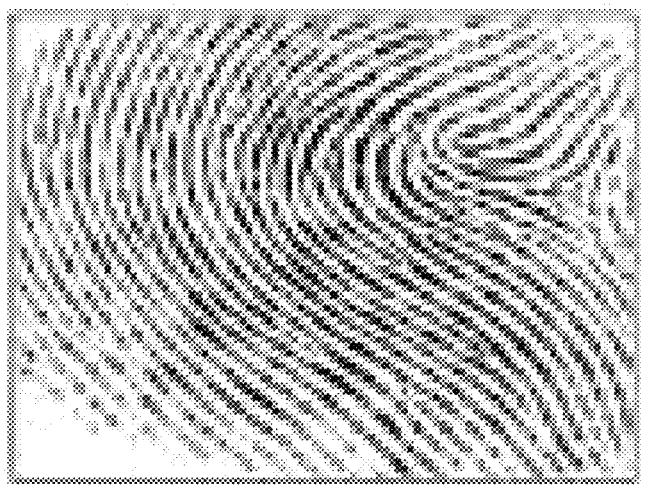

FIG. 8A is a schematic diagram illustrating fingerprint identification effects achieved based on grayscale signals or chromatic signals according to an embodiment of the present disclosure.

As shown in FIG. 8A, due to factors such as touch intensity, touch angle, surrounding environment, and so on during fingerprint identification, the grayscale signal or chromatic signal used for fingerprint identification will change with different positions of the fingerprint convex portion or the fingerprint concave portion, and the fingerprint processing signal corresponding to each detection pixel is different. Therefore, the fingerprint processing signal processed by the processor is a high resolution signal, this fingerprint processing signal contains rich information, the data that needs to be processed is complicated, and the amount of data calculation is large.

FIG. 8B is a schematic diagram illustrating fingerprint identification effects achieved based on low resolution signals according to an embodiment of the present disclosure.

Because of the low resolution, the information contained in this fingerprint processing signal is not as rich as that contained in the high resolution signal, but it is also sufficient for fingerprint identification.

Taking that the fingerprint processing signal corresponding to the fingerprint convex portion is 1 and the fingerprint processing signal corresponding to the fingerprint concave portion is 0 as an example, the processor can only further process the signal of the portion where the fingerprint processing signal is 1 (i.e., the fingerprint convex portion) for fingerprint identification. Because the different grayscales in fingerprint identification are no longer distinguished, all the fingerprint processing signals corresponding to the detection signals (which have large changes relative to the detection signals when no fingerprint detection is performed) are processed as 1, so the data to be processed by the processor is simpler, the processing is faster. After binarization at the fingerprint sensor side, the amount of data to be processed as received by the processor from the fingerprint sensor is significantly reduced, the processing becomes very easy, and the processing speed is significantly improved.

Figure 9:
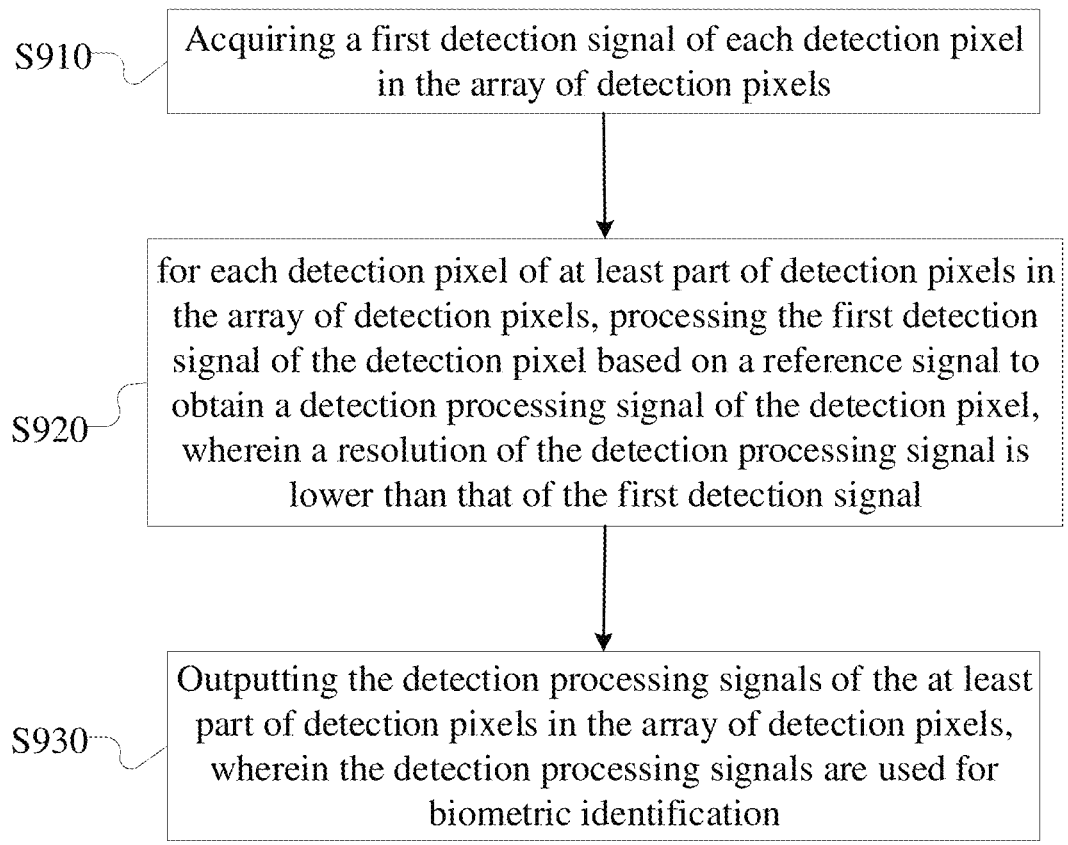
FIG. 9 is a schematic flowchart showing a signal processing method for a biometric detection sensor according to an embodiment of the present disclosure.

FIG. 9 is a schematic flowchart showing a signal processing method 900 for a biometric detection sensor according to an embodiment of the present disclosure. The method 900 can include steps S910 to S930.

The biometric detection sensor includes an array of detection pixels. In step S910, a first detection signal of each detection pixel in the array of detection pixels is acquired.

Optionally, the biometric detection sensor can be implemented based on ultrasonic waves or capacitance.

In step S920, for each detection pixel of at least part of detection pixels in the array of detection pixels, the first detection signal of the detection pixel is processed based on a reference signal to obtain a detection processing signal of the detection pixel, wherein a resolution of the detection processing signal is lower than that of the first detection signal.

For example, the first detection signal can be a grayscale signal with a value range of 0 to 255, it can be represented by 8 bits, and its resolution is 8 bits or 256; the detection processing signal can be a binary signal, it can be represented by 1 bit, and its resolution is 1 bit or 2.

It should be understood that when biometric detection is performed, it is possible to process the first detection signals of all detection pixels, and it is also possible to process the first detection signals of part of detection pixels (e.g., 50% of detection pixels are selected, or detection pixels in part of areas are selected, etc.) according to the needs and required processing accuracy.

Optionally, the reference signal can be either a signal acquired by detection or a preset signal.

According to an embodiment of the present disclosure, in the case where the reference signal is a signal acquired by detection, second detection signals of the at least part of detection pixels in the array of detection pixels can be acquired when no biometric detection is performed; and the reference signal is determined based on the second detection signals of the at least part of detection pixels when no biometric detection is performed.

It should be understood that the process of acquiring the second detection signal of the at least part of detection pixels in the array of detection pixels can be performed before or after the biometric detection is performed.

More specifically, the reference signal for each detection pixel can be determined based on the second detection signal of the detection pixel when no biometric detection is performed; or the reference signal for each preset area can be determined based on the second detection signals of the at least part of detection pixels in the preset area when no biometric detection is performed, wherein the array of detection pixels includes at least two preset areas; or the reference signal for the array of detection pixels can be determined based on the second detection signals of the at least part of detection pixels in the array of detection pixels when no biometric detection is performed, and so on.

It should be noted that both the first detection signal and the second detection signal in the present disclosure are detection signals acquired by measuring signals of detection pixels, wherein the first detection signal is the detection signal of a detection pixel acquired when biometric detection is performed; the second detection signal is the detection signal of a detection pixel acquired when no biometric detection is performed.

According to an embodiment of the present disclosure, in the case where the reference signal is a preset signal, the reference signal for each detection pixel can be determined based on a preset calibration signal of the detection pixel; or the reference signal for each preset area can be determined based on a preset calibration signal of the preset area, wherein the array of detection pixels includes at least two preset areas; or the reference signal for the array of detection pixels can be determined based on a preset calibration signal of the array of detection pixels.

Optionally, the detection processing signal can be a binary signal, and the biometric detection sensor can binarize the first detection signal of the at least part of detection pixels based on the reference signal, to obtain the binarized detection processing signal (i.e. the binary signal) of the at least part of detection pixels.

More specifically, for each pixel in the at least part of detection pixels, the binarized detection processing signal of the detection pixel can be generated based on a difference between the first detection signal and the reference signal, wherein the detection processing signal is determined to be a first value when the difference between the first detection signal of the detection pixel and the reference signal is smaller than a first threshold; the detection processing signal is determined to be a second value when the difference between the first detection signal of the detection pixel and the reference signal is greater than or equal to the first threshold.

For example, in an application scenario where the biometric detection sensor is a fingerprint sensor, the detection processing signal corresponding to a fingerprint concave portion can be determined to be the first value; and the detection processing signal corresponding to a fingerprint convex portion can be determined to be the second value.

According to an embodiment of the present disclosure, the detection processing signal is determined to be a first value in the case where the difference between the first detection signal of the detection pixel and the reference signal is smaller than a first threshold; the detection processing signal is determined to be a second value in the case where the difference between the first detection signal of the detection pixel and the reference signal is greater than or equal to the first threshold. The processor can be caused to only further process the detection processing signal of each detection pixel whose detection processing signal is the second value, so as to perform biometric detection. That is, the processor only further processes the detection processing signal corresponding to the first detection signal with a large change relative to the reference signal, so that the amount of data to be processed in biometric identification is effectively reduced.

Optionally, in the application scenario where the biometric detection sensor is a fingerprint sensor, the fingerprint sensor is an ultrasonic fingerprint sensor or a capacitive fingerprint sensor.

In step S930, the detection processing signals of the at least part of detection pixels in the array of detection pixels are outputted, wherein the detection processing signals are used for biometric identification Optionally, the first detection signals of the at least part of detection pixels in the array of detection pixels can be outputted in response to an output switching signal, for performing biometric identification, wherein the first detection signals of the at least part of detection pixels are grayscale signals or chromatic signals. By switching the output signals, the detection processing signals or the first detection signals can be outputted for different biometric detection scenarios, so as to perform biometric identification with different accuracy requirements.

Optionally, the array of detection pixels can include a first area and a second area, and the at least part of detection pixels are located in the first area of the array of detection pixels, and the signal processing method further includes: outputting the first detection signal of each detection pixel in the second area. By outputting different signals for different areas of the detection pixel array, biometric identification with different precision requirements can be realized for different areas to meet richer biometric identification requirements. For example, the first detection signal can be outputted for an area needing attention, and the detection processing signal can be outputted for other areas.

To sum up, the present disclosure provides a biometric detection sensor, a signal processing method for a biometric detection sensor, and an electronic product including a biometric detection sensor. As for the signal processing method for a biometric detection sensor in the present disclosure, the biometric detection sensor includes an array of detection pixels, the signal processing method includes: acquiring a first detection signal of each detection pixel in the array of detection pixels; processing the first detection signal for each detection pixel of at least part of detection pixels in the array of detection pixels based on a reference signal to obtain a detection processing signal of the detection pixel, wherein a resolution of the detection processing signal is lower than that of the first detection signal; and outputting the detection processing signals of the at least part of detection pixels in the array of detection pixels, wherein the detection processing signal is used for biometric identification.

Since the detection processing signal with low resolution is provided to the processor after resolution decreasing processing is performed on the detection signal at the biometric sensor side, the amount of data transmitted between the biometric sensor and the processor is reduced. Because the amount of data to be received and processed by the processor is reduced for each detected pixel or the pixel array per unit area, the processing speed of the processor is significantly improved.

In addition, while keeping the data transmission speed and the output processing speed of the existing processor, the biometric detection method of the present disclosure enables the processor to process more signals of detection pixels concurrently, thereby realizing biometric identification in a larger area and expanding the application range of the processor. On the other hand, while keeping the data transmission speed and the output processing speed of the existing processor, the frame rate of biometric detection can also be improved if the size of the pixel array of the biometric sensor is kepts unchanged, that is, the number of times that the pixel array can be scanned per unit time.

The present disclosure uses specific words to describe the embodiments of the present disclosure. Examples such as "first/second embodiment", "one embodiment" and/or "some embodiments" refer to a certain feature, structure or characteristic related to at least one embodiment of the present disclosure. Therefore, it should be emphasized and noted that "an embodiment" or "one embodiment" or "an alternative embodiment" mentioned twice or more in different places in this specification do not necessarily mean the same embodiment. In addition, some features, structures, or characteristics in one or more embodiments of the present disclosure may be appropriately combined.

Unless otherwise defined, all terms (including technical and scientific terms) used herein have the same meaning as commonly understood by those of ordinary skill in the art to which this disclosure belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, those skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the specific embodiments and other embodiments of the present disclosure are intended to be included in the scope of the attached claims. The present disclosure is defined by the claims and their equivalents.

The invention claimed is:

1. A signal processing method for a biometric detection sensor including an array of detection pixels, the signal processing method comprising:
   acquiring a first detection signal of each detection pixel in the array of detection pixels;
   for each detection pixel of at least part of detection pixels in the array of detection pixels, processing the first detection signal of the detection pixel based on a reference signal to obtain a detection processing signal of the detection pixel, wherein a resolution of the detection processing signal is lower than that of the first detection signal; and
   outputting the detection processing signals of the at least part of detection pixels in the array of detection pixels, wherein the detection processing signals are used for biometric identification.

2. The signal processing method according to claim 1, further comprising:
   acquiring second detection signals of the at least part of detection pixels in the array of detection pixels when no biometric detection is performed; and
   determining the reference signal based on the second detection signals of the at least part of detection pixels when no biometric detection is performed.

3. The signal processing method according to claim 2, wherein the reference signal is determined according to any one of the following:
   determining the reference signal for each detection pixel based on the second detection signal of the detection pixel in the case where no biometric detection is performed; or
   determining the reference signal for each preset area based on the second detection signals of the at least part of detection pixels in the preset area in the case where no biometric detection is performed, wherein the array of detection pixels includes at least two preset areas; or
   determining the reference signal for the array of detection pixels based on the second detection signals of the at least part of detection pixels in the array of detection pixels in the case where no biometric detection is performed.

4. The signal processing method according to claim 1, wherein the reference signal is preset, and the reference signal is determined according to any one of the following:
   determining the reference signal for each detection pixel based on a preset calibration signal of the detection pixel; or
   determining the reference signal for each preset area based on a preset calibration signal of the preset area, wherein the array of detection pixels includes at least two preset areas; or
   determining the reference signal for the array of detection pixels based on a preset calibration signal of the array of detection pixels.

5. The signal processing method according to claim 1, wherein
   for each detection pixel of the at least part of detection pixels, binarizing the first detection signal of the detection pixel based on the reference signal, to obtain the detection processing signal of the detection pixel.

6. The signal processing method according to claim 5, wherein, for each detection pixel of the at least part of detection pixels, the detection processing signal of the detection pixel is generated based on a difference between the first detection signal and the reference signal,
   wherein in the case where the difference between the first detection signal of the detection pixel and the reference signal is smaller than a first threshold, the detection processing signal is determined to be a first value; in the case where the difference between the first detection signal of the detection pixel and the reference signal is greater than or equal to the first threshold, the detection processing signal is determined to be a second value.

7. The signal processing method according to claim 6, wherein the biometric detection sensor is a fingerprint sensor, wherein
   the detection processing signal corresponding to a fingerprint concave portion is the first value; and
   the detection processing signal corresponding to a fingerprint convex portion is the second value.

8. The signal processing method according to claim 7, wherein the fingerprint sensor is an ultrasonic fingerprint sensor or a capacitive fingerprint sensor.

9. The signal processing method according to claim 1, further comprising:
   outputting the first detection signals of the at least part of detection pixels in the array of detection pixels in response to an output switching signal,
   wherein the first detection signals of the at least part of detection pixels are grayscale signals or chromatic signals.

10. The signal processing method according to claim 1, wherein the array of detection pixels includes a first area and a second area, and the at least part of detection pixels are located in the first area of the array of detection pixels, and the signal processing method further comprises: for the detection pixels located in the second area,
    outputting the first detection signal of each detection pixel in the second area.

11. An electronic product that comprises the biometric detection sensor and realizes biometric identification by the signal processing method according to claim 1.

12. A biometric detection sensor for being arranged opposite to a touch cover, comprising:
    an array of detection pixels including a plurality of detection pixels, wherein for at least part of detection pixels among the plurality of detection pixels, each detection pixel includes:
    a detection electrode and a detection circuit for generating a first detection signal, and a signal processing circuit configured to process the first detection signal of the detection pixel based on a reference signal to obtain a detection processing signal of the detection pixel, wherein a resolution of the detection processing signal is lower than that of the first detection signal; and a signal output circuit configured to output the detection processing signals of the at least part of detection pixels in the array of detection pixels, wherein the detection processing signals are used for performing biometric identification.

13. The biometric detection sensor according to claim 12, wherein the signal processing circuit is further configured to:
   acquire second detection signals of the at least part of detection pixels in the array of detection pixels when no biometric detection is performed; and
   determine the reference signal based on the second detection signals of the at least part of detection pixels when no biometric detection is performed.

14. The biometric detection sensor according to claim 13, wherein the signal processing circuit determines the reference signal according to any one of the following:
   determining the reference signal for each detection pixel based on the second detection signal of the detection pixel when no biometric detection is performed; or
   determining the reference signal for each preset area based on the second detection signals of at least part of detection pixels in the preset area when no biometric detection is performed, wherein the array of detection pixels includes at least two preset areas; or
   determining the reference signal for the array of detection pixels based on the second detection signals of the at least part of detection pixels in the array of detection pixels when no biometric detection is performed.

15. The biometric detection sensor according to claim 12, wherein
   the signal processing circuit binarizes the first detection signal of each detection pixel of the at least part of detection pixels based on the reference signal, to obtain the detection processing signals of the at least part of detection pixels.

16. The biometric detection sensor according to claim 15, wherein, for each pixel in the at least part of detection pixels, the signal processing circuit generates the detection processing signal of the detection pixel based on a difference between the first detection signal and the reference signal,
   wherein in the case where the difference between the first detection signal of the detection pixel and the reference signal is smaller than a first threshold, the detection processing signal is determined to be a first value; in the case where the difference between the first detection signal of the detection pixel and the reference signal is greater than or equal to the first threshold, the detection processing signal is determined to be a second value.

17. The biometric detection sensor according to claim 15, wherein the biometric detection sensor is a fingerprint sensor, wherein
   the detection processing signal corresponding to a fingerprint concave portion is the first value; and
   the detection processing signal corresponding to a fingerprint convex portion is the second value.

18. The biometric detection sensor according to claim 17, wherein the fingerprint sensor is an ultrasonic fingerprint sensor or a capacitive fingerprint sensor.

19. The biometric detection sensor according to claim 12, wherein for at least part of the plurality of detection pixels, each detection pixel further includes:
   a switching circuit configured to realize switching output between the first detection signal and the detection processing signal of the detection pixel in response to an output switching signal;
   wherein the first detection signal of the detection pixel is a grayscale signal or a chromatic signal.

* * * * *